United States Patent [19]
Cole et al.

[11] Patent Number: 4,995,035
[45] Date of Patent: Feb. 19, 1991

[54] CENTRALIZED MANAGEMENT IN A COMPUTER NETWORK

[75] Inventors: Leo J. Cole, Raleigh; Curtis J. Frantz, Durham; Jeannette Lee; Zvonimir Ordanic, both of Raleigh, all of N.C.; Larry K. Plank, Rochester, Minn.

[73] Assignee: International Business Machines Corporation, Armonk, N.Y.

[21] Appl. No.: 265,104

[22] Filed: Oct. 31, 1988

[51] Int. Cl.$^5$ ............................................. H04J 3/16
[52] U.S. Cl. ............................. 370/95.2; 370/85.8; 370/94.1; 340/825.08; 340/825.5
[58] Field of Search ........... 340/825.08, 825.5, 825.51; 370/85.7, 85.8, 95.1, 95.2, 94.1

[56] References Cited

U.S. PATENT DOCUMENTS

| | | | |
|---|---|---|---|
| 4,320,500 | 3/1982 | Barberis et al. | 370/94 |
| 4,654,656 | 3/1987 | Deaver et al. | 370/96 |
| 4,773,067 | 9/1988 | Duxbury et al. | 370/94 |
| 4,847,830 | 7/1989 | Momirov | 370/94 |

FOREIGN PATENT DOCUMENTS 0256991 12/1984 Japan .

Primary Examiner—Douglas W. Olms
Assistant Examiner—Alpus H. Hsu
Attorney, Agent, or Firm—Joscelyn G. Cockburn

[57] ABSTRACT

An improved method for dynamically and centrally managing a network which is being partitioned into Focal Point (FP) nodes and non-FP (NFP) or serviced nodes. Each FP node provides management services to an assigned group of non-FP nodes. The names of the non-FP nodes are maintained in a table called a "sphere of control" (SOC) table at the FP node that services those NFP nodes. As NFP nodes in the SOC table become active, the FP establishes a session with the NFP node and sends it a "Request to be Your FP" message. If the NFP node supports the keys (bit pattern identifying a particular category of management services data) for which authorization is being requested, the NFP node replies positively acknowledging the requestor as its focal point for the specified key. Thereafter, problem messages which are related to the particular type of management services are forwarded to the FP node.

16 Claims, 9 Drawing Sheets

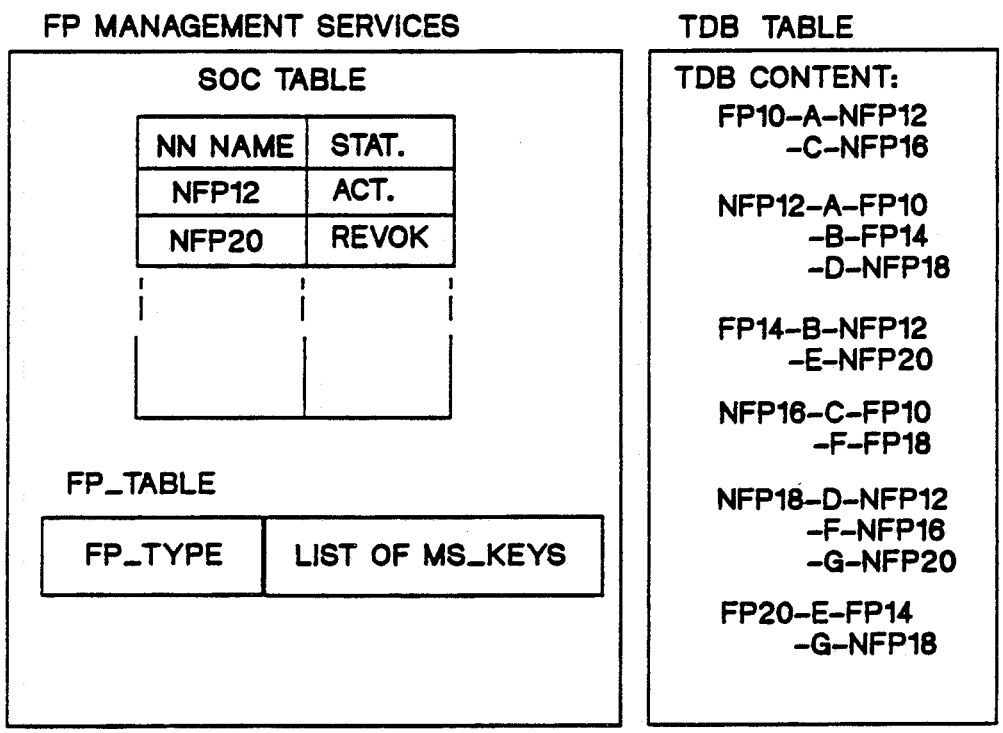

CENTRALIZED MANAGEMENT IN A COMPUTER NETWORK

CROSS REFERENCE TO RELATED PATENT APPLICATION

Co-pending patent application Ser. No. 062,280, by A. E Baratz et al entitled "Method for Disseminating Network State Information" discloses a method for disseminating network state information between network nodes. The subject co-pending application is assigned to the assignee of the present invention and is incorporated herein by reference.

BACKGROUND OF THE INVENTION

1. Field of the Invention

The present invention relates to computer networks in general and more particularly to improved methods for managing said networks.

2. Prior Art

The proliferation in computer networks creates a need for more efficient methods to manage and control said networks. The need is particularly pressing for large mesh networks wherein the topology of the network is constantly changing by addition and/or deletion of network nodes. Such deletions and/or additions may be the result of expansion or contraction in the network and/or communications failures in a node or link. Because of the dynamic characteristics of these networks, a dynamic management approach which adjusts and provides management services for the changing network is desirable.

A communications network typically consists of a plurality of nodes and communications links interconnecting the nodes. The nodes can act as information accepting locations (origin nodes), information sink locations (destination nodes) or an intermediate node which passes a message from the origin to the destination. Each node is provided with a plurality of functions which interact and enable the node to perform an assigned task.

Among the many functions which are provided is the so-called "Management Service (MS) Function." This function usually resides in the System Support Control Point (SSCP) of a node. It gathers management information about the network and reports it to an operator. For example, one type of management service may handle error conditions in a network. On the occurrence of a network error condition, the management service is made aware of the condition. The management service in turn notifies a network operator who can take appropriate steps to correct the error condition.

Currently, networks are managed on a "domain" basis. This means that a network is partitioned into different domains and each SSCP provides management services for resources in its own domain. There are no provisions for cross-domain management. However, there are times when cross-domain management is desirable to effectuate better management of the network. For example, cross domain management is preferred where the network is comprised of a relatively large number of domains with each domain requiring an operator. By using cross-domain management, fewer operators are required to manage the network.

SUMMARY OF THE INVENTION

It Is therefore the general object of the present invention to provide an apparatus and method which manage a network more efficiently than was heretofore possible.

It is a more specific object of the present invention to provide cross-domain management.

It is still another object of the present invention to provide dynamic management service functions which adapt to compensate for changes in the network.

The objectives are achieved by partitioning the network into control nodes which are called focal point nodes (FP nodes) and managed nodes called non-focal point nodes or "NFP Nodes." Each FP node is provided with a "Sphere of Control" (SOC) table that lists the NFP nodes which are managed by the FP node. As nodes become active in the network, the FP node is made aware of them. The FP node searches its SOC table to see if the node is listed. If the node is listed, the FP node generates and transmits a request message asking it to be its "focal point." If accepted, the NFP node issues a favorable response. The FP node that explicity lists the NFP nodes is called the primary FP. Thereafter, informational messages relative to authorized types of management services are exchanged freely between the FP node and the NFP node.

There are at least three types of Request Messages, namely: (a) Request to be your Primary FP, (b) Request to be your Secondary FP, and (c) Request to be your Backup FP. The Request to be your Backup FP is used between FP nodes.

In one feature of this invention, a FP node can be designated to provide management services for NFP nodes not listed in the SOC table of other FP nodes. This FP node is called the secondary FP. The secondary FP issues to an NFP node a "request to be your secondary FP" message even though the NFP node is not in its SOC table. In this case request message (b) above is the selected one. This message provides management services for NFP nodes that are not assigned to a Primary FP.

The foregoing and other objects and features of this invention will be more fully described in the accompanying drawings.

BRIEF DESCRIPTION OF THE DRAWINGS

FIG. 4 shows FP Management Services (MS) tables.

FIG. 5 shows NFP (MS) tables.

DESCRIPTION OF THE PREFERRED EMBODIMENT

Figure 1:
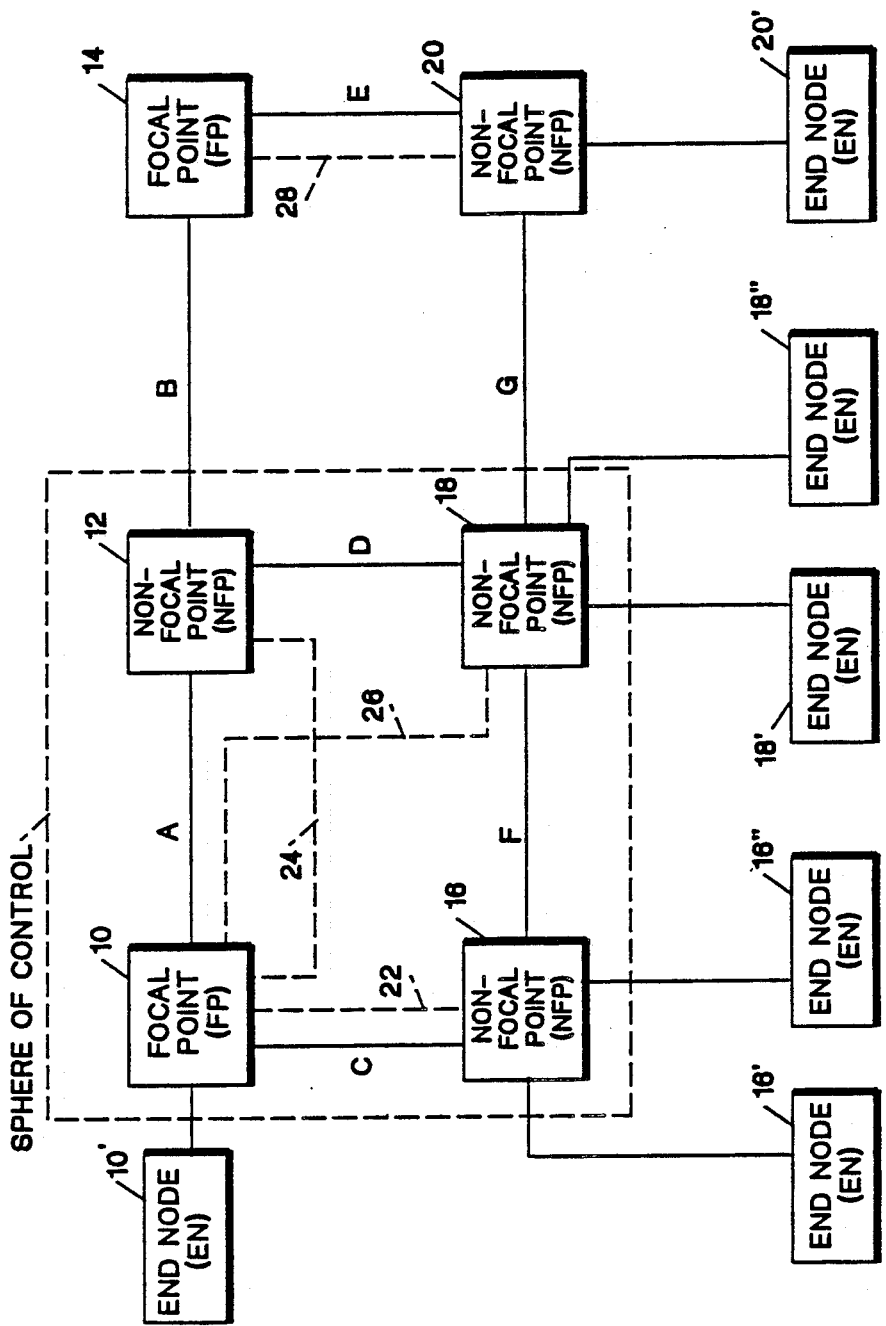
FIG. 1 shows a schematic of a network partitioned in accordance with the teachings of the present invention.

FIG. 1 shows a block diagram of a communications network which includes the teachings of the present invention. The network of FIG. 1 is merely exemplary as to the number of nodes and is not intended in any way to limit the scope or teachings of the present invention. The network includes a plurality of end nodes (EN) 10', 16', 16", 18', 18" and 20' coupled by respective communications link to network nodes (NN). The end nodes may include devices such as personal computers, printers, word processing stations, computers, etc. Computers and other data processing equipment which are end nodes usually do not participate in network functions such as routing, etc. The network nodes participate in providing network functions to attached end nodes.

Still referring to FIG. 1, the network nodes include focal points (FP) nodes 10 and 14 and non-focal points (NFP) nodes 12, 16, 18 and 20. The network nodes are interconnected by communications links A, B, C, D, E, F and G. As will be explained subsequently, the focal point nodes provide management services for the non-focal point nodes. Stated another way, the non-focal point nodes such as 16, 18, 20 and 12 are managed or serviced by focal point nodes 10 and 14. In particular, FP 10 manages or services NFP 12, NFP 16 and NFP 18. To show that NFP 12, NFP 16 and NFP 18 are managed by FP 10, this group of nodes is interconnected by broken lines 22, 24 and 26. Similarly, focal point 14 manages non-focal point node 20 and is interconnected by broken line 28. Thus, in FIG. 1 the solid interconnecting lines represent communications links while the broken interconnecting lines represent management links. It should be noted that management links are not physical lines in the network. They are only used to show the relationship between managed and managing network nodes. They are also called sessions.

Figure 2:
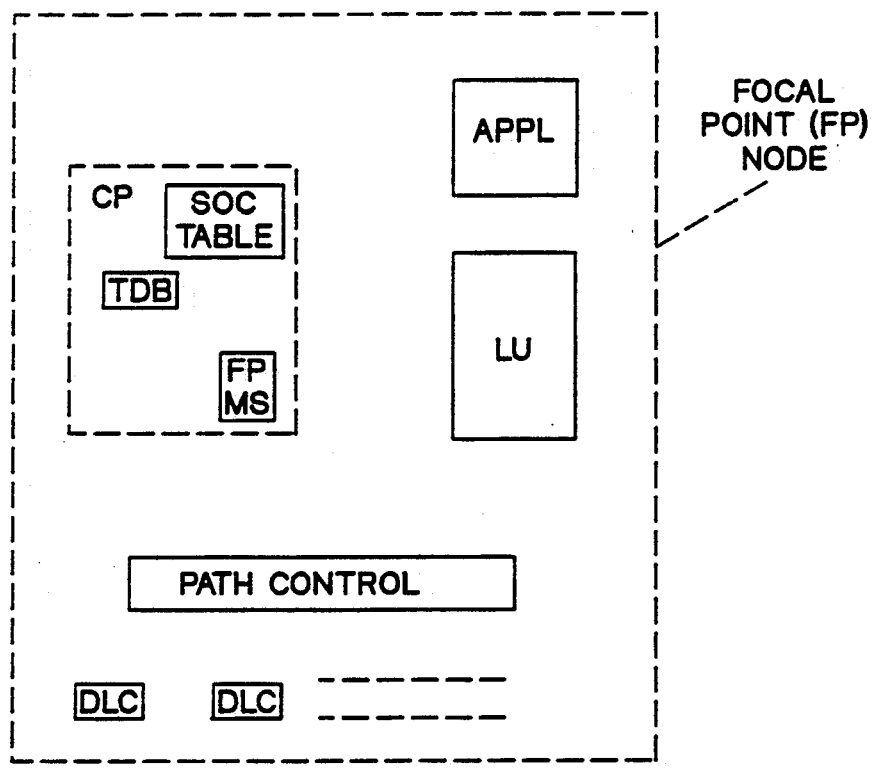
FIG. 2 shows a functional diagram of structures for a FP node.

FIG. 2 shows a functional structure for a focal point node. The structure of the focal point node is similar to the structure of the well-known APPN nodes. Details of the APPN nodes are set forth in:

1. "Advanced Program to Program Communication and Advanced Peer-to-Peer Networking Users Guide", a manual for IBM AS/400 system, SC21-9598. AS/400 is a Trademark of International Business Machines Corporation, 2. "Advanced Peer to Peer Networking (APPN) for AS/400 System, GC24-3287. The referenced manuals are incorporated herein by reference.

Since the functional structure of the node is well defined, only those components which are necessary to practice and understand the present invention will be described. To that end, the focal point node includes a control point (CP), application (APPL) programs, logical unit (LU), path control, SOC table and a plurality of data link control (DLC) modules. The data link control modules provide protocol functions so that messages leaving from a focal point node can be arranged in a desired protocol for transmission over a communication link. Multiple DLC indicates that the FP supports different types of protocols. The path control module provides the routing function to enable messages to be exchanged between two nodes. The CP provides the control function for the node. For example, it controls sessions, calculates routes, directory services, etc. Finally, the LU provides the interface which allows an application program access into the network. The present invention impacts the conventional APPN node and provides improved management services by adding the application programs, and focal point management service (FPMS) tables. It also makes use of the APPN's topology data base (TDB). Details on each of these components will be given subsequently. Suffice it to say at this point that the addition of these components provides improved methods for managing a network.

Figure 3:
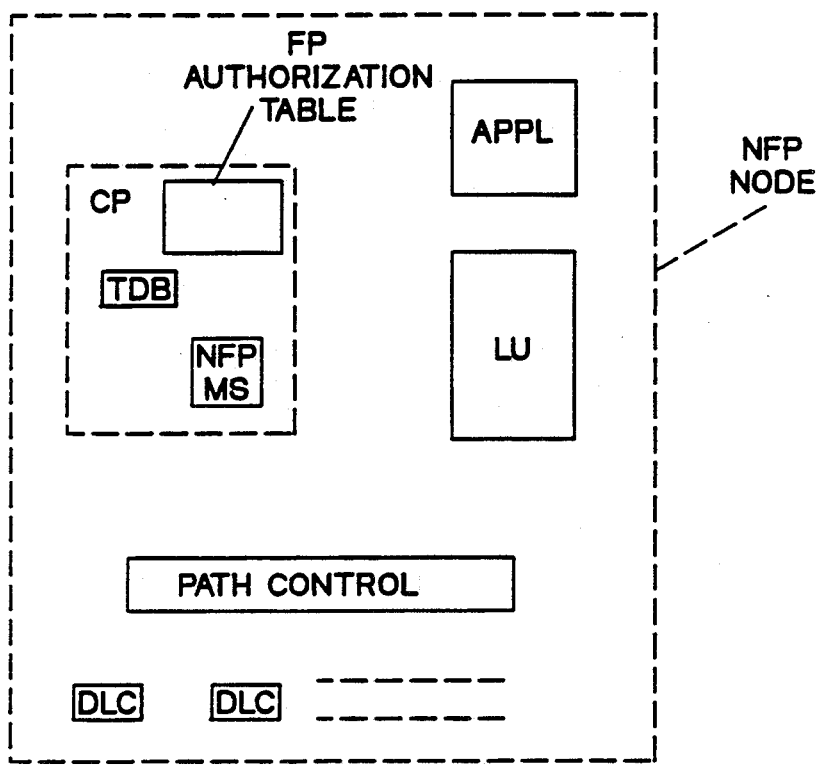
FIG. 3 shows a functional diagram of structures for a NFP node.

FIG. 3 is a functional block diagram for a non-focal point (NFP) node. The non-focal point node is structurally similar to an APPN node and the focal point node previously described in FIG. 2. This being the case, only the functions which have been added by the present invention will be described. The added functions include an application program called here a non-focal point management services (NFP-MS) program, and the FP authorized table. Details of the added functions will be described subsequently. Suffice it to say at this point that the added functions cause a non-focal point node to respond to the focal point node and exchange messages which cause the non-focal point node to transmit management services information including error conditions, alerts, etc. to the focal point node which controls or services the non-focal point node.

FIG. 4 shows the tables which are used by the CP of the focal point node. The tables include a Sphere of Control (SOC) and FP table. These tables are used by a focal point management services program. The figure also shows an example of topology data base (TDB) corresponding to the network example shown in FIG. 1. The topology data base (TDB) identifies the topology of network nodes. This includes a listing of nodes and links between them with a status indicating whether or not an interconnecting link is currently active or inactive. It should be noted that the TDB table is present in all network nodes whether it is a focal point node or a non-focal point node. From this TDB table a node can determine whether or not there is an active connectivity to a given network node. By way of example, the TDB of FIG. 4 lists the nodes and connectivity for the network in FIG. 1. Thus, as can be seen from the table, network node FP 10 is connected by links A and C to network nodes NFP 12 and NFP 16. Similarly, network node NFP 12 is coupled via communication links A, B and D to network nodes FP 10, FP 14 and NFP 18, respectively, and so forth. As stated previously, a similar TDB table is provided in a non-focal point node. An example of a topology data base table which can be used in the present invention is set forth in U.S. Pat. No. 4,644,532 which is incorporated herein by reference.

Still referring to FIG. 4, the FP management services module includes a sphere of control (SOC) table and a focal point (FP) table. The SOC table contains a list of all network nodes for which this focal point is responsible (i.e., manages). The network operator can dynamically add or delete network nodes to the SOC table and also display current status for all nodes defined in the SOC table. The table also contains a status (STAT) for each node. Thus, by way of example, NFP 12 is active. Similarly, NFP 20 is revoked (REVOK), etc. Table 1 below shows a listing of status for network nodes and an interpretation for each one. These will be described more fully in later sections of this document.

TABLE 1

| STATUS | INTERPRETATION |
|---|---|
| Active | The node is in the sphere of control, |

TABLE 1-continued

| STATUS | INTERPRETATION |
| --- | --- |
| | connectivity to the node exists and the focal point is actively providing focal point services to this node. |
| Inactive, Not in Network | The FP does not have connectivity to the node. |
| Inactive, Session Down | The FP has lost its management services session with the node and is attempting to re-establish that session. |
| Rejected | The node has rejected FP services. |
| Revoked | Another FP has taken over as the active FP. |

As can be seen from the above Table 1, when a non-focal point node is marked active in the table, the responsible focal point is providing active focal point services to that node. The other possible states that a non-focal point node may be in are set forth in Table 1 and the associated interpretations are clearly explained. Thus, no further description of Table 1 will be given.

A focal point can be responsible for different management services functions for different spheres of control. That is, a single focal point may maintain multiple sphere of control tables, one for each management services focal point function it provides. Associated with each sphere of control table, the focal point management services module contains a record called FP-Table. This table contains a focal point type field and a list of management services (MS) key fields. This record is transmitted from a focal point node to a non-focal point node in a request focal point authorization message. The FP type field tells what type of focal point the node is and the MS key list identifies the network management services provided by this focal point. Each MS key identifies a specific management service. The present invention defines the following FP types: primary, secondary and backup.

Primary FP- is the FP for the network management category identified by the management services keys (MS-keys), and it provides services for network nodes identified explicitly in the SOC table.

Secondary FP- is the FP for network nodes that were not assigned to a primary FP (not defined in SOC table of any primary FP).

Backup FP- is the FP that backs up another FP. It acts as a FP when the primary FP is not operational.

Table II below shows a example of possible codings for an FP-Table in which the associated FP node is a Primary and Secondary for the management services listed in the management services key field. Hex (X) notations are used to code the management services which the node supports. In the preferred embodiment of this invention X'0000' identifies that the FP supports the receiving of Alerts sent by the non focal point nodes, and X'0025' identifies that the FP supports receiving the problem determination statistical information. As is indicated by the dots, other management service keys can be listed in the key field. In addition, a "1", in the FP-Type field of Table II, indicates a Primary FP, a "2" indicates a Secondary FP and a "3" indicates a Back-up FP.

TABLE II

| FP-TABLE | |
| --- | --- |
| FP-Type | List Of MS-Keys |
| bit 1 2 3 | X'0000', X'0025'........ |

"(1 is Primary; 2 is Secondary; 3 is backup)";

As will be explained subsequently, this focal point record is transmitted with the request message to a non-focal point node.

FIG. 5 shows the focal point authorization table which is present in the non-focal point management service (NFP-MS) node of FIG. 3. The TDB table of FIG. 3 is identical to the previously-described TDB table and therefore further description will not be repeated. The focal point authorization table (FIG. 5) lists focal point names, management services (MS) keys and focal point types. As will be explained subsequently, when a focal point node sends out a request message to a non-focal point node, the message includes a focal point name, MS keys and the Focal Point type.

The non-focal point node uses the information received in the request to update the FP Authorization Table. The non-focal point node uses the information in the FP Authorization Table to route specific management services data, defined by the specific Management Services key (MS key) to the appropriate FP node. The same table also informs the non-focal point node if the management services are provided by the primary or secondary focal point node. The non-focal point node will reject a request received from a secondary FP if the non-FP node is already receiving services from a primary FP for the specific MS Key.

Figure 6:
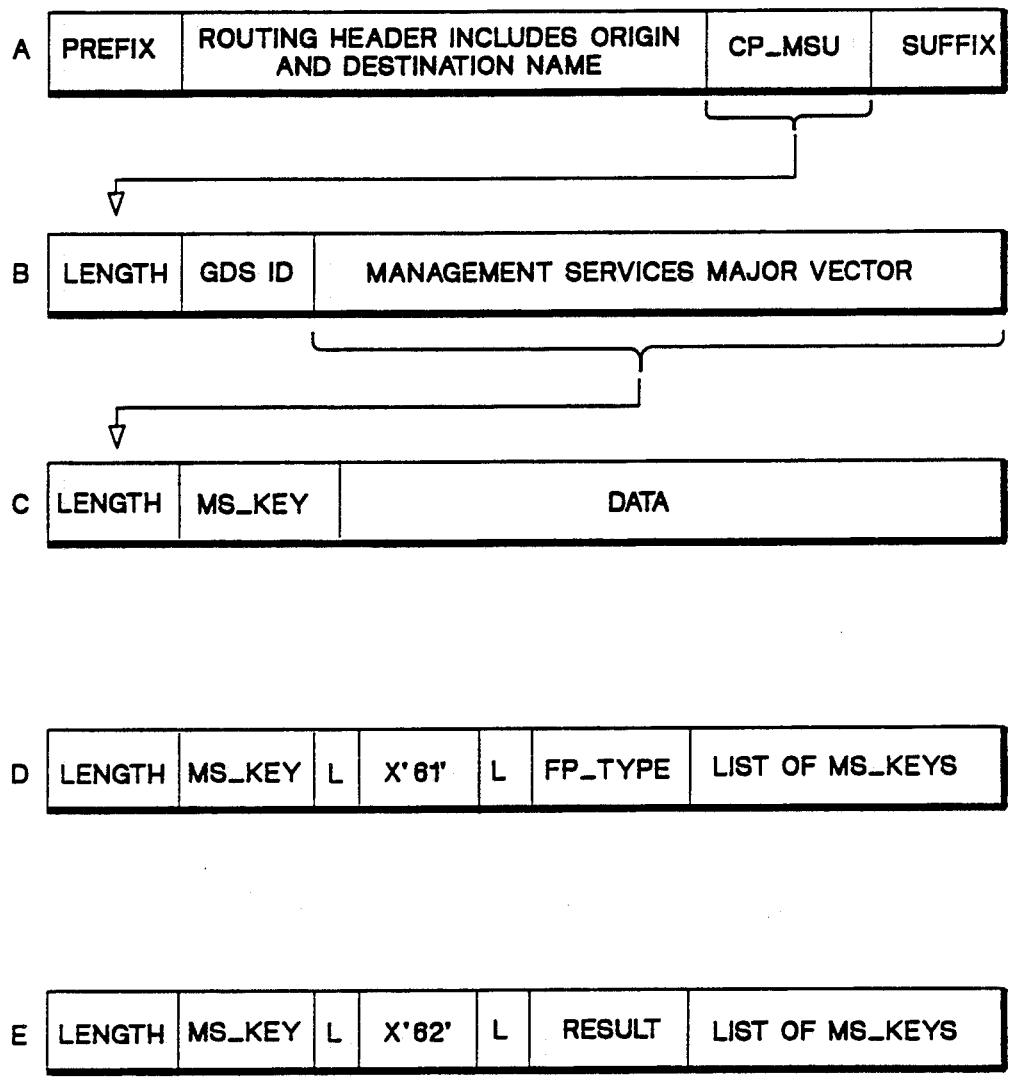
FIGS. 6A–6E show MS Message Formats.

FIGS. 6A–6E show formats for the messages which are exchanged between a focal point and a non-focal point node. FIGS. 6A–6C show the general management services message format. This message format includes a prefix field, a routing header field, a CP-MSU (management service unit) field, and a suffix field. The routing header field includes the origin and destination name of the stations involved. By way of example, the origin name would be the name of the station which originates the message while the destination name is the name of the node to which the message is sent. The CP-MSU field (FIG. 6B) is further divided into a length field, general data stream (GDS) ID field and a management service major vector field. In the preferred embodiment of this invention, the GDS ID field carries the notation Hex or X'1212'. This notation indicates that the message is a management services type message. The management services major vector field is further divided into a length field, an MS-key field and a data field. As stated before, each of the keys indicate the type of management services which a FP node supports. By way of example, the following MS keys are defined: X'0000'—indicates an alert, X'0025'—indicates problem determination statistics, X'80F0' indicates MS capabilities request and X'00F0' indicates MS capabilities reply. It should be understood that these keys are merely exemplary and do not limit the invention in any way.

Referring to FIGS. 6D and 6E, specific formats which are used for establishing communications between focal point nodes and nodes in the sphere of control table are shown. The format in FIG. 6D is a request format while the format in FIG. 6E is a reply format. Stated another way, the format of FIG. 6D is generated and transmitted to a non-focal point node entering (i.e., becoming active) into the network. The same format is used for a "Request to Be Your Primary FP" or a "Request to Be Your Secondary FP." The message format in FIG. 6E is generated and returned to the focal point node. The format in FIG. 6D includes a length field, MS key field, a length field, a request identifier field, a length field, an FP type field, and a list of MS keys. The request field carries a code indicating that the message is a request. In the preferred embodiment of this invention the code is X'61'. Of course, other codes can be used without deviating from the scope of the present invention. Each length (L) field in the message indicates the number of bytes which immediately follow. The other fields such as the MS key, FP type and l keys field have already been described and will not be repeated here. Suffice it to say that in a preferred embodiment of the invention the FP-type field (FIG. 6D) includes the following coding X'10' for Primary FP, X'20' for Secondary FP and X'30' for Backup FP. Likewise, the list of MS-keys includes X'0000' and X'0025'. Of course, other codings can be placed in either or both fields without departing from the teachings of the present invention.

The reply message (FIG. 6E) has a structure similar to the request message. The code X'62' is used to identify that the message is a reply. The reply message also includes a result field which carries information to inform the FP node if the request is accepted, rejected, revoked, etc. In a preferred embodiment of the invention X'10' is an accept, X'20' is a reject and X'30' is a revoke. The list of MS keys is a record of the keys for the services which the non-focal point node accepts.

As described previously, both the non-focal point node and the focal point node are provided with respective application programs which cause the node to perform functions necessary to provide management services according to the teachings of the present invention. It is those programs that this document will now describe.

Figure 7A:
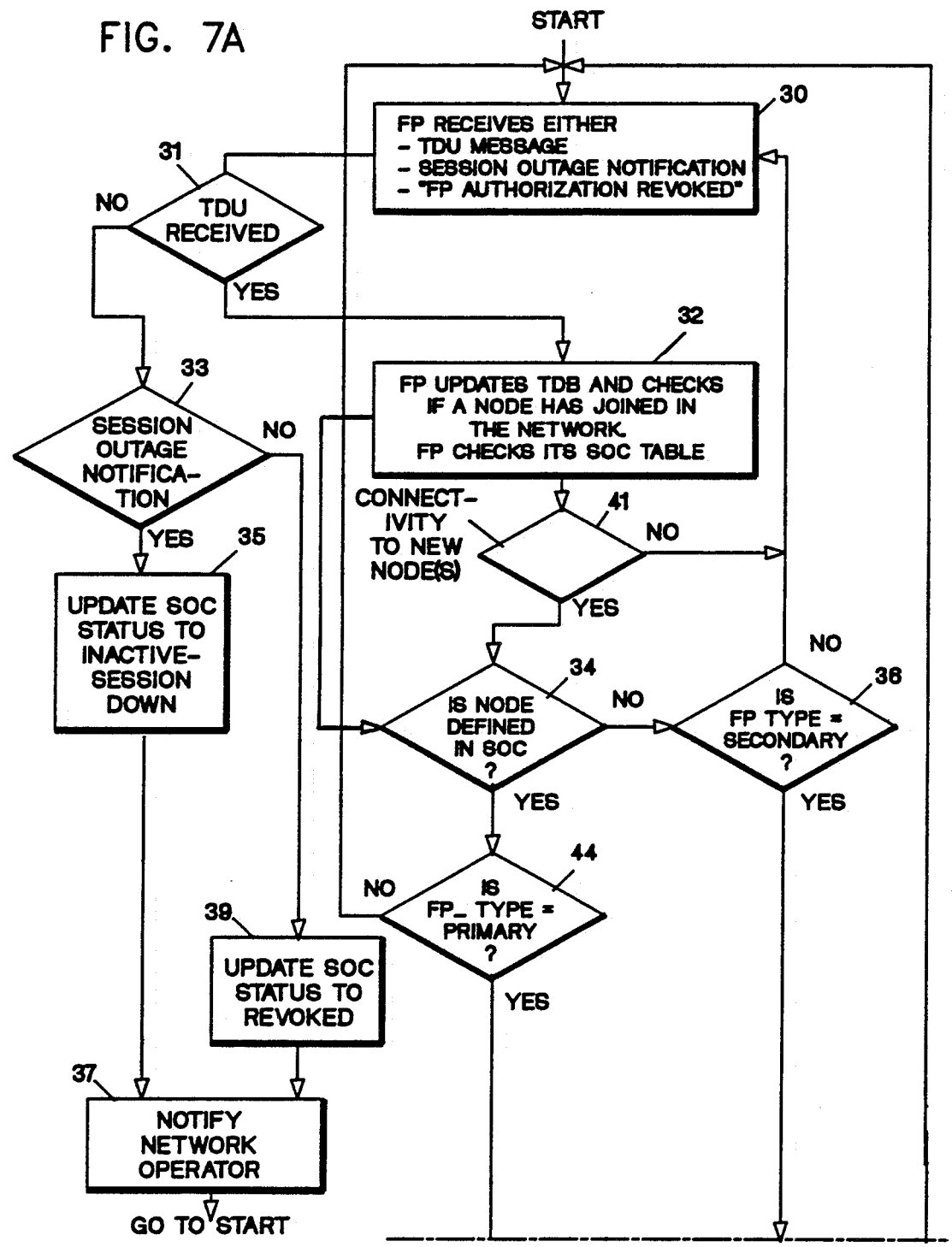
FIGS. 7A and 7B show a flow chart of a program used at a FP node.
Figures 7, 7B:
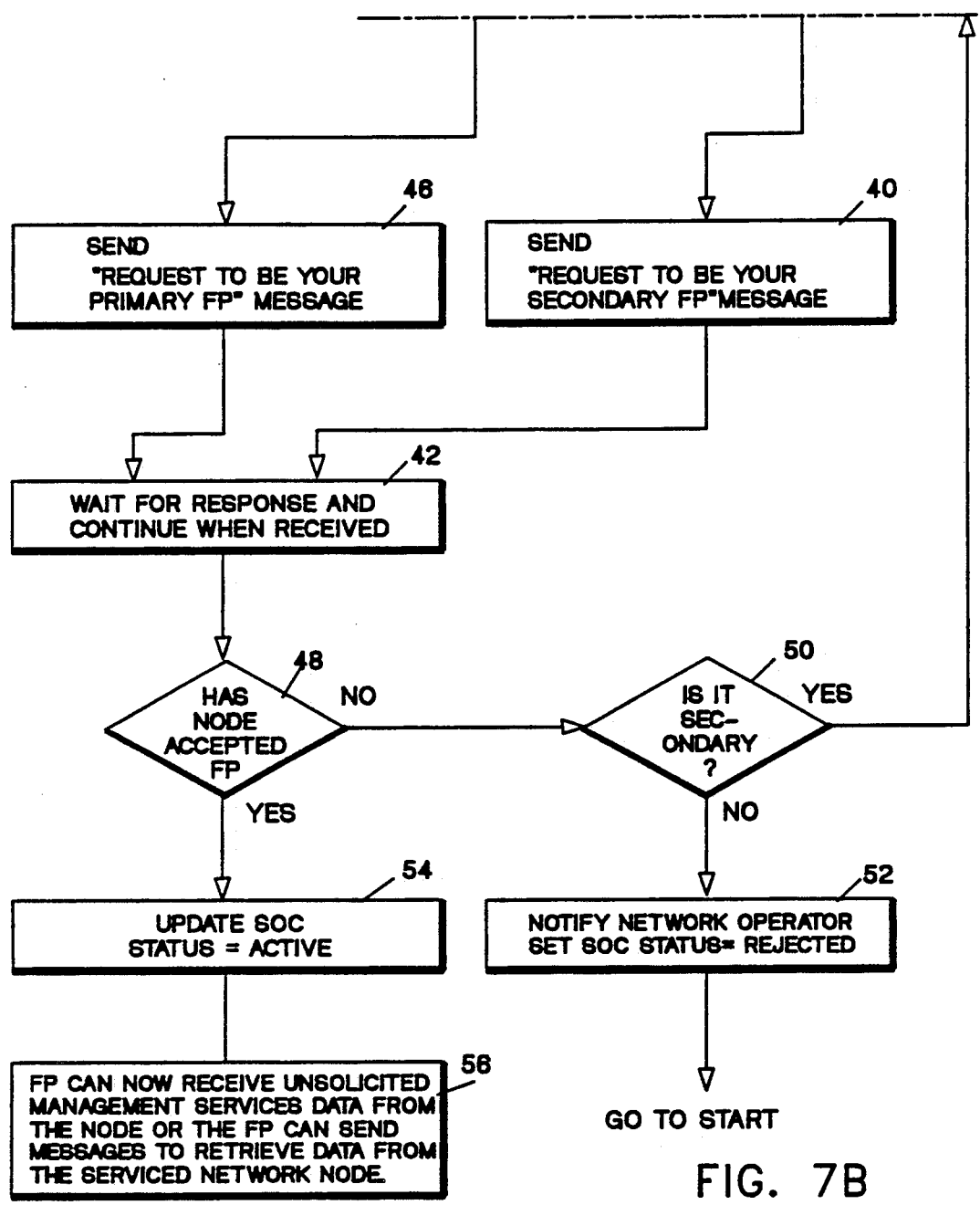

FIGS. 7A and 7B show a flow chart of the algorithm or program that resides at the focal point node. Execution of the program causes the FP node to perform the steps necessary to effectuate the teachings of the present invention. The program comprises of an entry point called a start. From the start, the program descends into block 30 where it waits until the focal point node receives a topology data base update message or session outage notification or "FP Authorization Revoked" message. The topology data base update message (TDU) is regularly provided to update the topology data table that resides in each network node. The program then descends into block 31, where it checks to see if a TDU message has been received. If the result is "yes" (Y), the program then descends into block 32. In block 32 the focal point updates the topology data base and checks if a new node has joined the network. The program then descends into decisional block 34. In block 34 the program checks to see if the node which recently became active is defined in its sphere of control table. If it is not defined in the table, the program enters the decisional block 36. In block 36 the program checks to see if the FP type equals secondary for some MS keys. If it is not equal to secondary, the program loops back into block 30. With reference to block 36, if the focal point type is secondary, the program descends into block 40. In block 40 the program generates and sends a "request to be your secondary focal point" message and descends into block 42 where it waits for a response from the non-focal point node.

Still referring to FIGS. 7A and 7B, and with respect to block 34, if the recently active node is defined in the sphere of control table, the program descends into decisional block 44. In block 44 the program checks to see if focal point type equals primary. If it does not, the program loops back into block 30. Otherwise, the program descends into block 46 where it sends out a "request to be your primary focal point" message. From block 46 the program descends into block 42 where it waits for a response from the non-focal point node and continues when received. The program then descends into decisional block 48. In decisional block 48 the program checks to see if the non-focal point node accepts the focal point. Whether or not the node accepts the focal point (FP) depends on the information carried in the request. Specifically, it depends on the FP-type field and list of MS-key field of the Request Message (FIG. 6D). If the message is a "request to be your secondary FP" and the non-FP node already has another FP as a primary for the same MS keys, the node will not accept the request. If the node rejects the request, the program enters block 50 where it checks its table to see if it is a secondary focal point. If it is, the program loops back to block 30. If it is not, the program then descends into block 52. In block 52 the program notifies the network operator of the rejection and enters rejected in the status column of the sphere of control table (FIG. 4). From block 52 the program then goes back to start.

Still referring to FIGS. 7A and 7B, and with respect to decisional block 48, if the non-focal point node accepts the focal point as its focal point for the particular type of service, the program descends into block 54. In block 54 the program changes the status in the SOC table to "active" and descends into block 56. In block 56 the focal point can now receive unsolicited management services data from the node. The focal point can also send messages to retrieve data from the serviced network node.

This algorithm is also used initially when a FP program becomes active or when a node is dynamically added to the SOC. When an FP program becomes active, it will first check the TDB Table and for each non-focal point node defined in the SOC table for which connectivity exists, the FP will use the same algorithm as if the node has just joined the network. When a node is added to the SOC table, the FP program first determines if connectivity to that node exists and proceeds from block 41.

Still referring to FIGS. 7A and 7B, and with respect to block 31, if a TDU message has not been received, the program exits along the NO (N) path into block 33. In block 33 the program checks if a "Session Outage Notification" has been received. If a "Session Outage Notification" has been received, the program descends into block 35 where it updates the status of a NFP node, in the SOC Table, to "Inactive-Session Down" and descends into block 37. In block 37, the program notifies the network operator and returns to start. With reference to block 33, if a "Session Outage Notification" was not received, the program descends into block 39 where it updates the status of a NFP node, in the SOC table, to "Revoked" and descends into block 37 where it performs the previously described functions.

Figure 8:
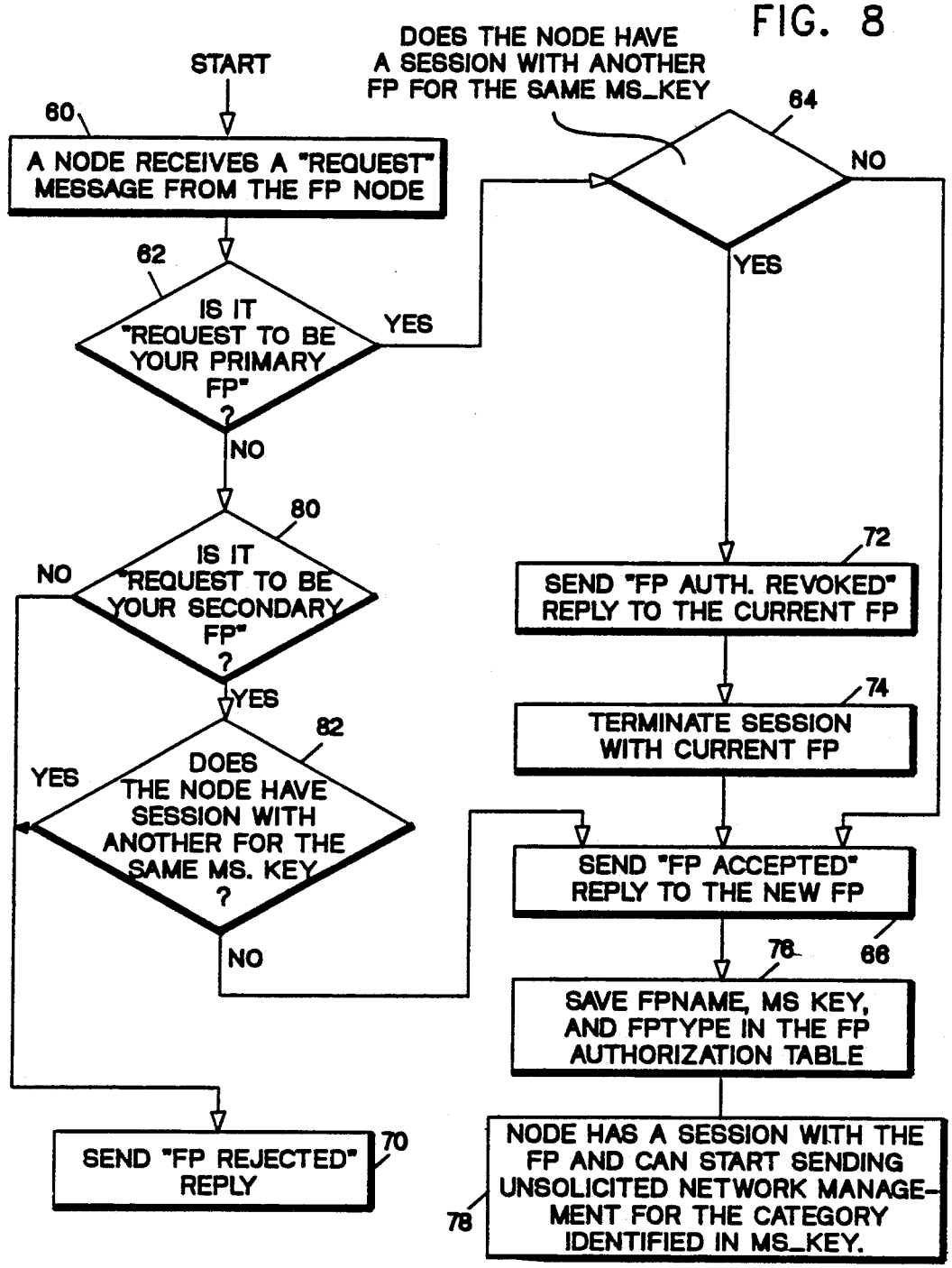
FIG. 8 shows a flow chart of a program used at a NFP Node.

FIG. 8 shows a flow chart for the algorithm used in a non-focal point node. From the start block, the program descends into block 60. In block 60 the non-focal point node receives a request message from a focal point node. The program descends into block 62 where it checks to see if the message is a "request to be your primary focal point" message. If it is, the program checks its FP authorization table (FIG. 5) to see if the node already has a session with another focal point for the same MS-key (block 64). If it does not, the program enters block 66. In block 66 the node sends a "focal point accepted" reply message to the focal point.

With reference to block 64, if the node has a session with another focal point for the same MS key, the program descends into block 72. In block 72 the program sends "focal point authorization (AUTH) revoked" in the reply message to the current focal point. The program then descends into block 74 where it terminates the session with the current focal point and sends a "FP Accepted" reply message to the new FP (block 66). It should be noted that all sessions are set up and controlled by the LU function in each network node (NN). The program then descends into block 76 where it updates its focal point authorization table (FIG. 5) with the focal point name, MS key, and focal point type from information received in the focal point request message. Thereafter, the node (block 78) can start sending unsolicited network management information for the category identified by the MS key.

Still referring to FIG. 8 and decisional block 62 in particular, if the answer to the question in block 62 is no, the program descends into decisional block 80. In block 80 the program checks to see if it is a "Request to be Your Secondary Focal Point." If it is not, the program descends into block 70 where it sends the "focal point rejected" reply to the focal point node. Otherwise, from block 80 the program descends into decisional block 82. In decisional block 82 the program checks to see if the node has a session with another primary focal point. If the response is yes, the program descends into block 70. If the answer is no, the program descends into block 66. When a non-focal point node loses a session with the FP node, it deletes entries in the FP Authorization Table associated with this FP node. This completes the description of the programs which are used to implement the present invention.

Figure 9:
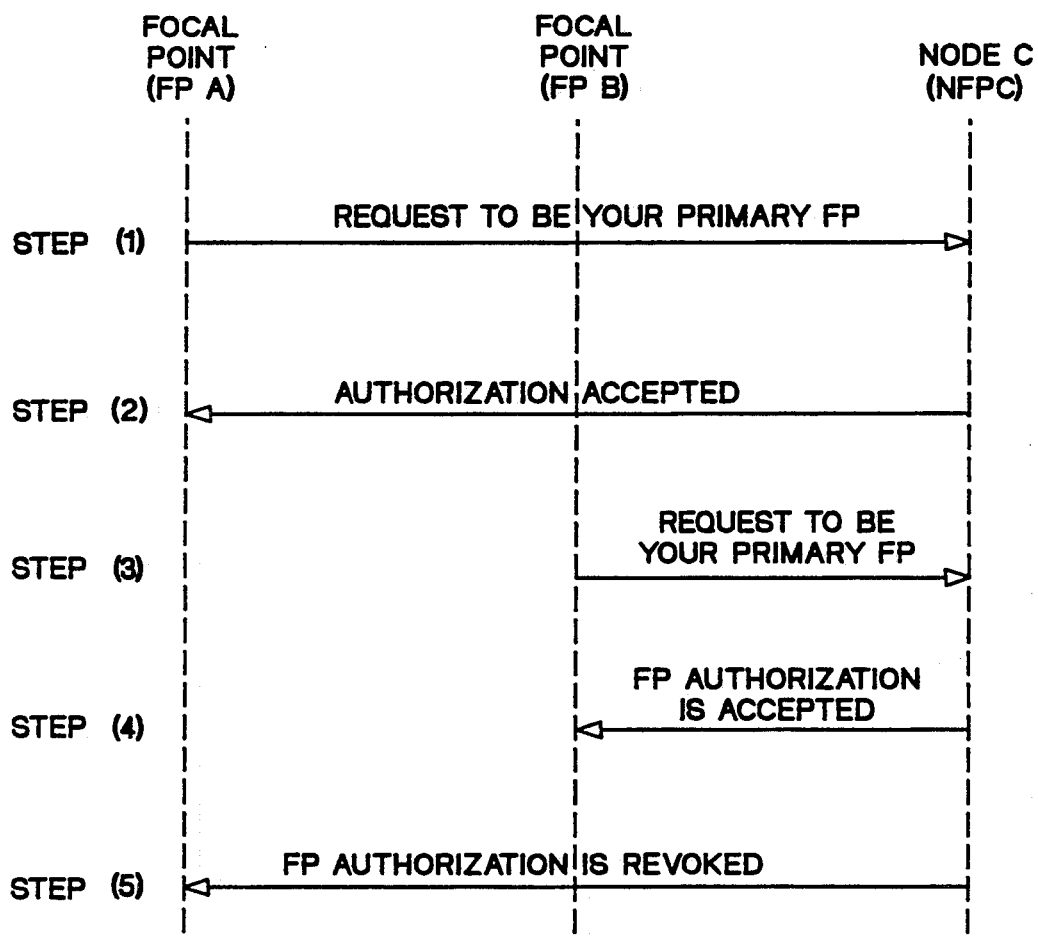
FIG. 9 shows flows demonstrating a NFP Node changing its FP Node.

One of the unique characteristics of the present invention is that non-focal point nodes which are in the SOC of a FP Node can be changed dynamically. This is illustrated by the flow control schematic in FIG. 9. The network nodes are captioned at the top of the drawing as focal point A, focal point B and node C. Each arrow in this flow diagram shows the direction in which information flows between the nodes. Thus, in step 1 focal point A issues a "request to be your primary focal point" message to node C. This comes about because node C is listed in the sphere of control table of focal point A which establishes a session between itself and node C and then issues the request message. Step 2, node C accepts the request and issues the "authorization accepted" message to focal point C. In the preferred embodiment of this invention, node A accepts by issuing a control vector X'62' code in the reply message. Step 3 shows focal point B issuing a "request to be your primary focal point" message to node C. This occurs because node C has just been defined in the SOC table at focal point B. Focal point B establishes a session with node C and issues a "Request to be Your Primary FP" message. Node C accepts the request and issues two messages, one to focal point B accepting the request and one to focal point A (Step 5) revoking the previous authorization. In this particular example, it should be noted that the order of the request from the primary focal point A or B to node C determines which focal point has the authorization and which authorization will be revoked. In this particular example, the focal point which issues the second request is deemed to take precedence over an earlier request. Of course, some other types of priority succession can be arranged without deviating from the scope or teachings of the present invention.

Figure 10:
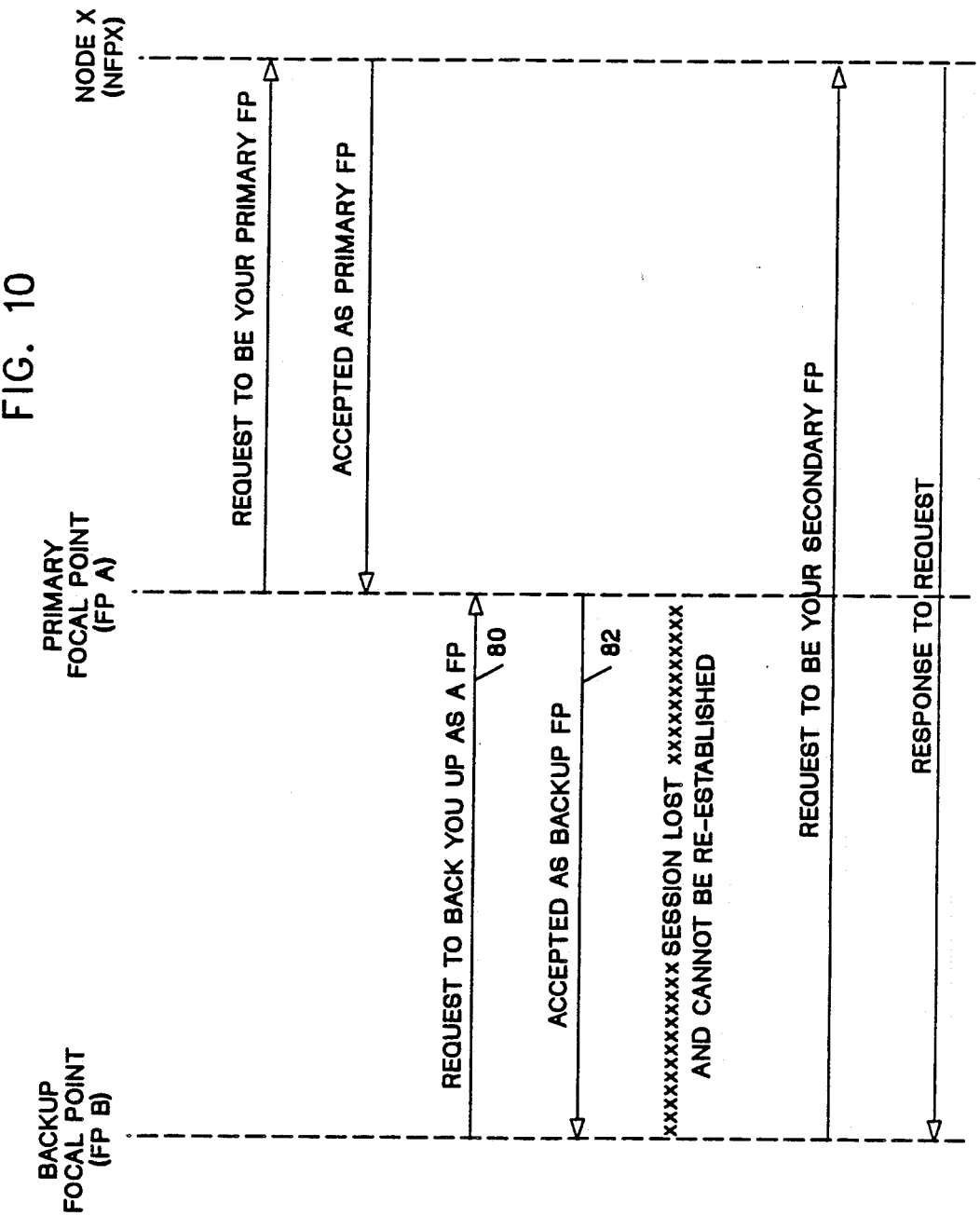
FIG. 10 shows flows illustrating communications involved in establishing a "backup" FP Node.

One of the request messages that a focal point can generate and transmit to another focal point is a "Request to Be Your Backup Focal Point" message. The communications which are exchanged between backup focal point B, the primary focal point A and a serviced node such as node X is illustrated in FIG. 10. If a focal point is defined to provide backup function for another or other focal points, that focal point such as B in the figure, establishes a session with those it backs up. The backup focal point sends a "request to back you up as a focal point" message. The receiving focal point, such as focal point A, indicates if it supports having that focal point as a backup focal point. The authorization is rejected if the focal point is not a focal point for the keys specified by the backup focal point. With respect to FIG. 10, node X is in the sphere of control table of focal point A. Focal point B, as a backup for focal point A, will attempt to establish a session with node X when the session between A and B is lost and cannot be re-established.

In order for the backup focal point to establish a session with the nodes that are serviced by the primary focal point A, the backup focal point B must have knowledge of the sphere of control of the focal point being backed up (or perhaps a portion of that sphere of control if backup is provided by multiple focal points). When the session between a focal point and its backup fails, the backup focal point attempts to re-establish a session. If that session is re-established, the communications set forth in both flows 80 and 82 (FIG. 10) are allowed to occur. That is, "the request to back you up as a focal point" message is sent and replied to by the served focal point. However, if the session between a focal point and its backup cannot be re-established, the backup focal point notifies the local operator of this condition, and allows the operator to decide if the backup focal point should attempt to establish sessions with all nodes in that portion of the sphere of control of the lost focal point which it backs up. Operator intervention is preferred since the operator may have knowledge of why connectivity to the primary focal point was lost and thus may know if the backup is needed.

If sessions between the backup focal point and node in the backed up sphere of control are established, the "request to be your secondary focal point" message is sent to each node in the sphere of control of the primary focal point. The node will accept the secondary as its focal point if it does not have a focal point, otherwise it will reject the request.

Operation

In operation, names for a set of managed or serviced network nodes are defined in a sphere of control table at each focal point node. Names can be added or deleted dynamically by the focal point operator. As nodes, in an FP SOC table, become active, the focal point establishes a session with the node and sends it a "Request to be Your Primary Focal Point Message." If the node supports the key for which authorization is being requested, the node replies positively (acknowledging the requestor as its focal point for the specified keys). These keys can identify a particular category of management services data. If the authorization request is accepted, the node creates an entry in its directory of focal points (FIG. 5). The entry or entries in the directory of focal points can be used to determine the destination focal point for unsolicited messages or to determine if a particular focal point is authorized to send the specific management service request to the node. A password may be included in the request.

If the focal point is not accepted as a focal point from the node, the focal point may modify the request to be your focal point message and resubmit it, that is, change the key for which this focal point is requesting authorization, or indicate in its sphere of control table that the node has rejected the focal point request and notify the operator. If the focal point is accepted as a focal point for the node, the focal point receives all unsolicited management services data as sent by the node for the authorized key or keys.

A focal point is responsible for establishing sessions with each node name appearing in its user defined sphere of control table. The only exceptions are: nodes to which connectivity does not exist, nodes which reject the "request to be your primary focal point" message and nodes serviced by another focal point. When a node accepts a new focal point, it notifies the previous focal point that it is served by another focal point. When a session between a focal point and the node in its sphere of control is lost, if connectivity to that node exists, the focal point will establish a new session with that node. When that session is lost, the non-focal point node purges all entries in the FP Authorization Table associated with this FP node.

Several advantages accrue to the user of the present invention. Among the advantages are (1) management of a communication system can be performed at the site or sites specified by personnel responsible for the operation of the system, (2) the sites can be defined locally without a coordinated system definition, (3) structuring the network among management services focal points can be done by management services discipline (that is, problem management, performance, accounting management, configuration management, change management) or within discipline (example, within problem management Alerts of a certain type can be handled at one management services focal point, while all other Alerts are handled at another), (4) the set of nodes for which a management services focal point is responsible for a specific management services function can be changed dynamically without system redefinition, (5) backing up of focal points can be done dynamically, (6) nodes not assigned to a primary focal point can receive focal point services from a secondary, or default, focal point.

While the invention has been particularly shown and described with reference to a preferred embodiment thereof, it will be understood by those skilled in the art that various changes in form and details may be made therein without departing from the spirit and scope of the invention.

We claim:

1. An improved method for managing a computer network including a plurality of nodes interconnected by a communications network, said method comprising the steps of:
   (a) partitioning the network into at least one Focal Point (FP) node and a plurality of Non-Focal Point (NFP) nodes;
   (b) at the Focal Point node, maintaining a sphere of control (SOC) table than includes a listing of names of the Non-Focal Point nodes;
   (c) at each Non-Focal Point node, maintaining a Focal Point authorization table with said table at least containing indicia which indentifies the Focal Point node;
   (d) generating and sending from the Focal Point node to active Non-Focal Point nodes a "Request to be Your Focal Point" message;
   (e) for each Non-Focal Point node receiving the message of step (d), responding with an "Accept Request" message only if a None-Focal Point node ascertains that the Focal Point node is its primary Focal Point node; and
   (f) thereafter, said each Non-Focal Point node generating and forwarding information messages to the Focal Point node.

2. The improved method of claim 1 wherein the information message includes error reports.

3. The improved method of claim 2 further including the step of displaying the error reports at the Focal Point node.

4. In a computer network having a plurality of nodes interconnected by a plurality of communications links an improved method for managing said network comprising the steps of:
   (a) partitioning the network into a plurality of Focal Point and a plurality of Non-Focal Point nodes, with each Focal Point node assigned to provide management services to a selected group of Non-Focal Point nodes;
   (b) at each Focal Point node, maintaining a sphere of control (SOC) table that includes the names of the Non-Focal Point nodes which are being serviced by that Focal Point node;
   (c) at each Non-Focal Point node, maintaining a Focal Point authorization table that includes indicia that identifies Focal Point nodes and the type of management services that the nodes provide;
   (d) generating and sending a Focal Point node to active Non-Focal Point nodes a "Request to be Your Focal Point" message;
   (e) for selected ones of Non-Focal Point node receiving the message of step (d), responding with an "Accept Request" message only if a Non-Focal Point node determines that the Focal Point node is its servicing node; and
   (f) thereafter, said selected ones of Non-Focal Point node generating and sending to the Focal Point node information messages.

5. The improved method of claim 4 wherein the "Request to be Your Focal Point" message includes an identification code, and a type of service code which identifies the service the Focal Point node provides.

6. The improved method of claim 4 wherein the Focal Point authorization table includes Focal Point name field containing names of Focal Point nodes and type of service field with indicia indicating the type of service which a named Focal Point node provides to the node.

7. The improved method of claim 6 wherein a responding Non-Focal Point node in step (e) determines that the requesting Focal Point node is the primary servicing node if a type of service code indicia in the "Request to be Your Focal Point" message indicates that the Focal Point is primary.

8. The improved method of claim 6 wherein responding Non-Focal Point nodes of step (e) determine that the requesting Focal Point node is a servicing node if selected indicia in said "Request to be Your Focal Point" message matches selected indicia in said Focal Point authorization table.

9. In a communications network having a plurality of network nodes interconnected by a plurality of communications links an improved method for exchanging selected information between network nodes comprising the steps of:
   (a) selecting at least one network node as a control node;
   (b) maintaining in said one control node a list of network nodes which are being controlled by said control node;
   (c) maintaining in said one control node a topology data base which indicates changes in said network;
   (d) monitoring in said one control node the list of network nodes and the topology data base; and
   (e) as a network node becomes active node, issuing a "Request to be Your Focal Point" message to said active node.

10. The method set forth in claim 9 further including the steps of:
   (f) receiving the message at the active node;
   (g) examining the message at the active node to determine if the control node is providing primary or secondary management service functions; and
   (h) generating and transmitting a reply message at the active node accepting or denying the request from said control node.

11. An improved method for managing a computer network including a plurality of nodes interconnected by a communications network, said method comprising the steps of:
   (a) partitioning the network into at least one Focal Point (FP) node and a plurality of Non-Focal Point (NFP) nodes;
   (b) at the Focal Point node, maintaining a sphere of control (SOC) table that includes a listing of names of the Non-Focal Point nodes and a set of Management Service (MS) keys identifying services provided by the Focal Point node;
   (c) at each Non-Focal Point node, maintaining a Focal Point authorization table with said Focal Point authorization table at least containing indicia which identifies the Focal Point node and Management Service keys;
   (d) generating and sending from the Focal Point node to active Non-Focal Point nodes a "Request to be Your Focal Point" message;
   (e) for selected ones of Non-Focal Point nodes receiving the message of step (d) responding with an "Accept Request" message only if a Non-Focal Point node ascertains that the Focal Point node is its primary focal point node or if the node lacks a focal point for specified Management Service keys; and thereafter said selected ones of Non-Focal Point nodes, generating and forwarding informational messages with the specified Management Service keys to the Focal Point node.

12. The improved method set forth in claim 11 wherein the network of step (a) is being partitioned into at least two Focal Point nodes.

13. The improved method set forth in claim 12 further including the steps of designating one of the two Focal Point nodes as a Backup Focal Point node; and
   establishing communications between the Backup Focal Point node, another Focal Point node and the Non-Focal Point nodes so that the Backup Focal Point node assumes responsibility for servicing the Non-Focal Point nodes if said another Focal Point node is disabled.

14. In a computer network having a plurality of computer nodes interconnected by communications links an improved apparatus for managing said network comprising:
   at least one of the computer nodes providing management services to selected ones of said computer nodes; said at least one of the computer nodes including a storage means with a topology data base (TDB) table containing information about structures or activities of said computer nodes or a Focal Point management services table listing the selected ones of said computer nodes or codes representative of management services provided by said one computer node; and
   a control means located in said one computer node for monitoring said topology data base table or the Focal Point management services table and as the selected ones of said nodes become active, generate and transmit a "Request to be Your Focal Point" message to said nodes.

15. The improved apparatus of claim 14 wherein the "Request to be Your Focal Point" message includes a data field with coded signals identifying the management services which said at least one of the computer nodes provides.

16. The improved apparatus of claim 14 further including:
   means located at the selected ones of said computer nodes for receiving the "Request to be Your Focal Point" message;
   means provided in said selected ones of said computer nodes for correlating information contained in the "Request to be Your Focal Point" message with information contained in Focal Point authorization table and for generating and transmitting to said at least one of the computer nodes an "Accept Request" message only if the selected ones of said computer nodes determine that said at least one of the computer nodes is its servicing node.

* * * * *

UNITED STATES PATENT AND TRADEMARK OFFICE
CERTIFICATE OF CORRECTION

PATENT NO. : 4,995,035

DATED : February 19, 1991

INVENTOR(S) : Leo J. Cole, et al.

It is certified that error appears in the above-identified patent and that said Letters Patent is hereby corrected as shown below:

Column 11, claim 1, line 9, change "than" to --that--.
Column 13, claim 9, line 15, before "node" (second occurrence) insert --said control--.
Column 13, claim 10, line 27, change "at" to --from--.
Column 14, claim 14, line 30, after "said" insert --at least-- and after "one" insert --of the--.

line 31, after "said" insert --at least-- and after "one" insert --of the--.

line 34, after "said" insert--computer--, change " generate" to --generates--.

line 35, change "transmit" to --transmits--

Signed and Sealed this

Fifteenth Day of December, 1992

Attest:

DOUGLAS B. COMER

Attesting Officer

Acting Commissioner of Patents and Trademarks